INVENTOR.
Edward A. Everett
BY
Matthew N. Loughridge
ATTORNEY.

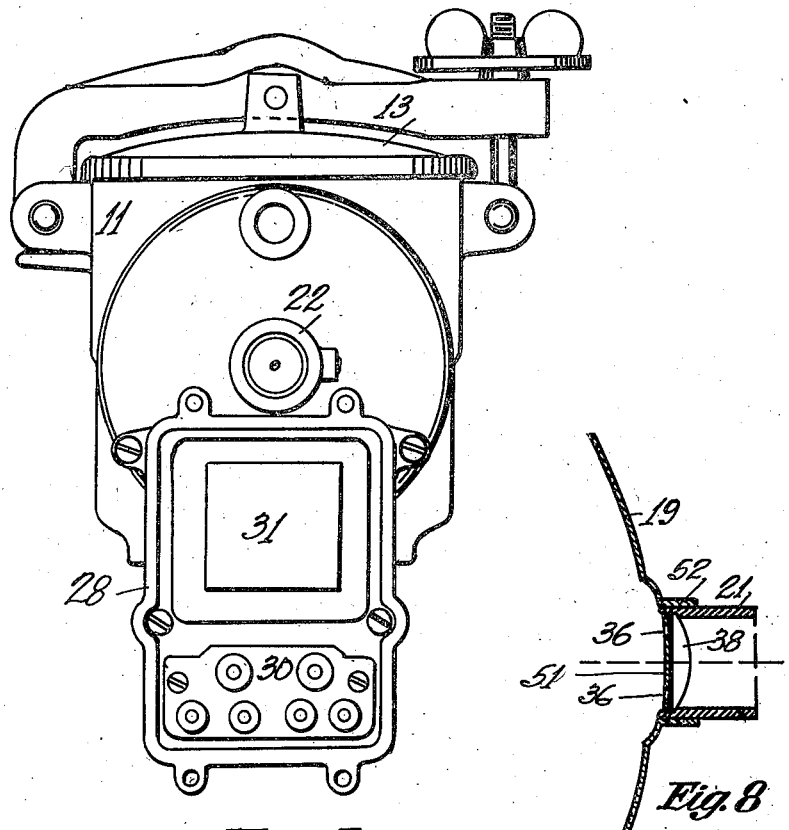

Patented May 28, 1929.

1,714,712

UNITED STATES PATENT OFFICE.

EDWARD A. EVERETT, OF NEW YORK, N. Y.

FOCUSING DEVICE.

Application filed March 10, 1927. Serial No. 174,365.

This invention relates to a focusing device of general application but is illustrated in connection with railway light signals of the type that produce their indication by a beam of light and has for an object to provide a signal with a projecting lens and a source of illumination with means for focusing said source with relation to said lens.

Figure 1:
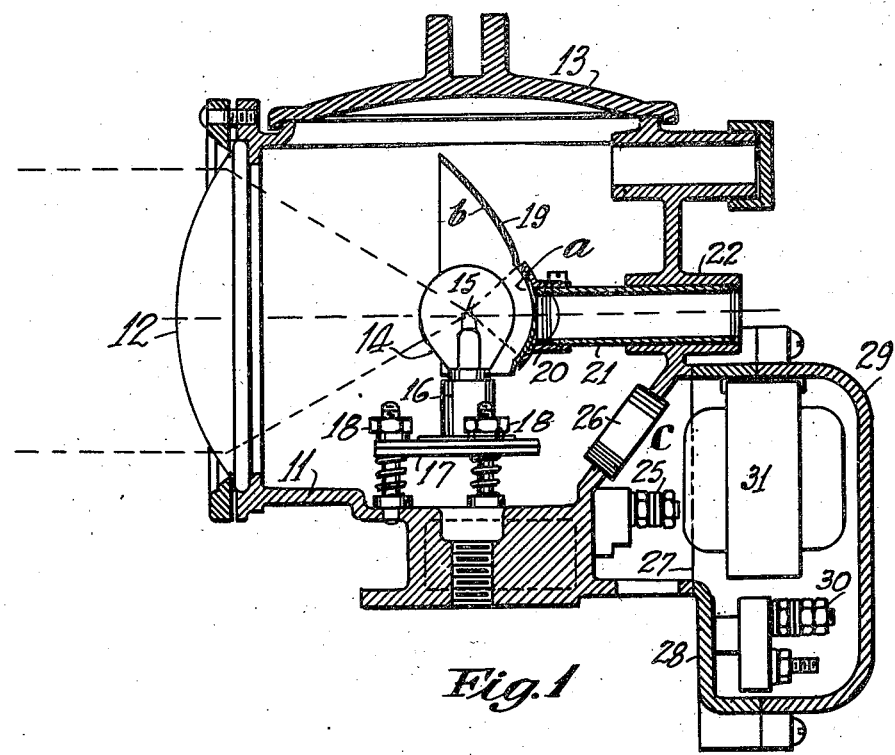
Figure 2:
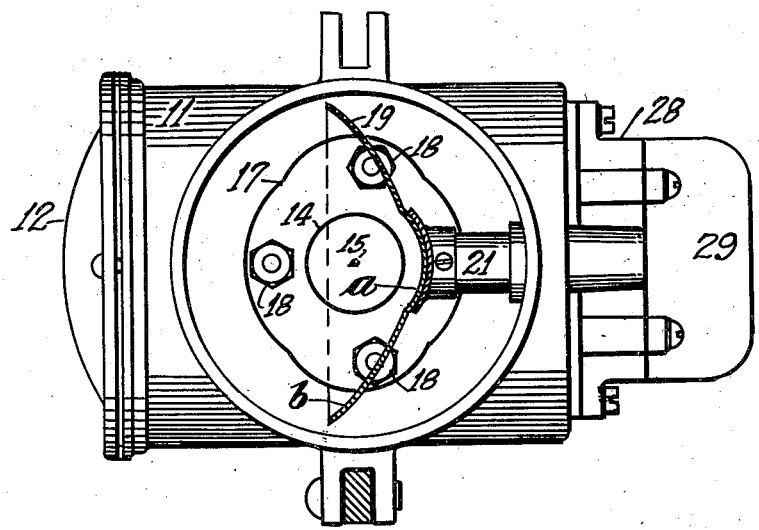

Other objects of the invention will appear from the following specification and the accompanying drawings, in which, Fig. 1, is a sectional elevation of a railway light signal embodying my invention, Fig. 2 is a top plan view corresponding to Fig. 1 with the cover removed and the reflector shown in section. Fig. 3 is a rear end view of the signal with the cover of the transformer housing removed, Fig. 4 is an enlarged cross-section through the sighting tube, Fig. 5 is a left hand end view of the sighting tube, Fig. 6 is a front view of the central portion of the reflector. Fig. 7 is a right hand end view of the sighting tube, and Fig. 8 shows an alternative arrangement of reflector.

The present invention is shown in connection with small power electric lights located at the exact focus of a projecting lens in a suitable housing and may be operated from primary batteries, or from a transmission line through a small transformer. The filament of the electric light bulb is concentrated in a small spiral, usually V shaped and the bulb is mounted on an adjustable stand so that it may be brought into proper focus. A variety of arrangements have been proposed for locating the filament at the focus of the projecting lens. Most of these find the focal point by intersecting sights, but some have been proposed whereby the focus is determined by the intensity of the light as it appears on a screen in a sighting tube. These methods require the operator to keep his eye at the sighting tube while the position of the light is adjusted by the sense of touch. In the present invention the position of the filament is determined by the position of its image on a focusing screen without regard to the intensity of this image and the screen itself is visible from the rear of the device at a distance and in daylight. This enables the operator to see the bulb and make adjustments thereof while keeping in sight the focusing screen with the result that adjustments can be made rapidly and accurately and the operator does not have to assume a cramped position in making these adjustments.

The object of a signal of this type is to project a beam of light of long range and comparatively narrow spread along a railroad track and to project a beam downwards at close range so that it may be readily seen at a distance and can be seen at close range from an engine cab on a lower elevation than the signal. For this purpose a compound reflector is provided with the central portion arranged to project the long range beam and with the top outer portion arranged to project a beam at close range towards the ground.

A separate compartment is provided in the housing for the wire terminals controlling the current to the bulb. When alternating current is used a transformer is necessary to step down the current to the low voltage necessary for the filament and it is desirable to locate this transformer as closely as possible to the bulb. This is provided for by locating the transformer in a separate housing which is attachable to the signal in place of the cover of the terminal compartment, thus the signal is readily converted from use by direct current to operate on alternating current.

Referring to the drawings, 11 is the housing of the signal device, 12 is the projecting lens, 13 is the cover and 14 is the lamp bulb having the concentrated filament 15 and supported in the socket 16 mounted on the adjustable base 17 which is adjusted by the screws 18 so that the base is elevated and tilted as desired to properly locate the filament.

The reflector is indicated by 19 and is of the parabola type but is constructed with an outer and inner curvature from a single spinning. The central or inner portion $a$ is curved to a shorter radius than the outer portion $b$. The central portion reflects the light between the dotted lines which forms the beam from the projecting lens 12 and thus strengthens this beam. The light reflected by the outer portion $b$ is deflected downwards through the lens 12 and thus makes the signal visible at close range. The lower portion of the reflector is cut away as shown as this portion is not required. The reflector is supported by the flanged collar 20 mounted upon the sighting tube 21.

The filament 15 is located on the axial line of lens 12 and at the focal point thereof by the sighting tube 21 which is secured in the boss 22 in the wall of the housing in fixed relation to the projecting lens and centered on the axial line thereof.

The terminals 25 are located in the terminal compartment c and the conductors are led from these terminals through the insulation block 26 to the bulb terminals. When operated by D. C. a cover is provided at 27 for this compartment, but when A. C. is used this cover is removed and the transformer housing 28 is attached by screws to housing 11 through the same holes as used to secure the cover in place. This housing is provided with a cover 29 and encloses the terminals 30 and the transformer 31 which steps down the current to the operating voltage of the bulb.

In operation, the projecting lens 12 and the sighting tube 21 are secured in the housing in fixed relation. The tube 21, Fig. 4 is provided with a frosted glass focusing screen as 39, at the outer end and with a disc 35 at the inner end. This disc has two or more perforations 36 at equal distance from the centre and is opaque, being preferably constructed from sheet metal. Just in rear of the disc 35 is the plano-convex lens 38 centered in the sighting tube. When the filament 15 is at the focal point of sighting lens 38 it is apparent that the images of the filament through each of the apertures 36 will be focused in the centre of the screen 39, a perfect focus being indicated by perfect overlapping of these images, one upon the other. On the other hand, if the filament 15 is out of foucs with the sighting lens 38 a separate image of the filament through each of apertures 36 will be displayed on screen 39 as indicated in dotted outline at 41. The spreading of these images therefore indicate that the filament is out of focus and concentration of the images upon the centre of screen 39 indicate that the point of focus has been reached. A ring is inscribed in the centre of screen 39 so that the location of the filament on the axial line of lens 12 can be accurately determined.

In assembling, the tube 21 is adjusted until the focus of lens 38 coincides with the focus of lens 12 and by locating the filament on screen 39 as described it is apparent that it is located at the exact focus of the projecting lens. The central portion of the reflector, Fig. 6 is provided with apertures 37 which register with the apertures 36 but are larger than apertures 36 so that the reflector offers no obstruction to the operation of the focusing tube.

Since the focusing is determined by the position of the plural images on screen 39 and this screen is exposed from the end of the signal the conditions of focus can be determined by an observer at a distance and this includes focus in every direction. This is an important feature of the invention as the bulbs must be adjusted in place at the top of a signal mast and the observer can direct his attention to the adjusting screws and thus save time in replacing lamps.

It should be observed that as screen 39 is approximately three times the distance of filament 15 from the lens 38; an error of adjustment in the filament is multiplied three times on the screen, thus accuracy is assured.

This focusing arrangement has been described in connection with a railway signal but it should be understood that it may be applied to any arrangement where a source of light is adjustably located at the focus of a projecting lens. It should be understood that a prism may be substituted for the lens 38, although the lens, being less expensive is shown in the drawings. It will be observed from Fig. 4 that the perforations in 35 are comparatively small and therefore a comparatively small cross-section of the lens 38 is used to project the images on the screen. This small section is the same in effect as if the lens had a plane instead of a curved surface which corresponds with the cross-section of a prism.

The arrangement in Fig. 8 shows the reflector 19 formed integral with the flange 52 which fits over the end of the sighting tube. The central portion of the reflector 51 is placed in the end of the tube and is perforated at 36 to perform the function of disc 35.

Having thus described my invention, I claim:

1. In a device as described, the combination, a housing with a projecting lens, a light source located at the focus of said lens, a sighting tube centered on the axial line of said lens having a disc with spaced apertures in the end, a sighting lens in said tube, a screen receiving the images of said source projected through the apertures in said disc and said sighting lens and a reflector for said light source supported in front of said tube and having apertures registering with the apertures in said disc.

2. In a device as described, the combination, a projecting lens, an adjustably located filament, a sighting tube on the axial line of said lens, means at the inner end of the tube provided with apertures equally spaced from said axial line, a sighting lens at said inner end located with reference to the focal point of said projecting lens and a focusing screen on the outer end of said tube having means inscribed thereon for locating said axial line and arranged to receive images of said filament through said apertures and lens whereby the relation of said filament to said axial line and to the focal point of said projecting lens is determined by the position of said images on said screen.

3. Means for ascertaining when a source of light is at a predetermined position by the relative position of images thereof to each other as projected on a screen, comprising a sighting tube for sighting the source having a closure at one end with a plurality of apertures therein equally spaced from a common centre, a lens centered on said common centre having a focal point corresponding with said predetermined position and a screen at the opposite end of said tube receiving the images of said source projected through the apertures by said lens.

4. In a device for determining the position of a source of illumination for a projector having a projecting lens, sighting means comprising a comparatively thin disc having a plurality of apertures equally spaced from the axial line of said projecting lens, a sighting lens secured in fixed relation to said projecting lens and centered on said axial line and a screen for receiving images of said source projected through said apertures by said sighting lens, said device being arranged so that the images overlap each other on said screen when said source is located at the focal point of said projecting lens.

5. In a projector provided with a housing, a projecting lens associated with said housing, a source of light and means for determining when said source of light is in the focus of said projecting lens, said means comprising a sighting tube centered on the axial line of said lens, means at the inner end of the tube provided with a plurality of comparatively small apertures equally spaced from the axis of said tube, a screen at the opposite end of said tube and means in said tube having a focal point corresponding with the focal point of said projecting lens for receiving and projecting the images of said light source through said apertures upon said screen.

In testimony whereof I affix my signature.

EDWARD A. EVERETT.